(12) United States Patent
Meier et al.

(10) Patent No.: US 9,154,836 B2
(45) Date of Patent: Oct. 6, 2015

(54) RESOURCE CONSERVATION FOR PACKET TELEVISION SERVICES

(71) Applicant: Rockstar Consortium US LP, Plano, TX (US)

(72) Inventors: Rolf G. Meier, Carp (CA); Timothy J. Rahrer, Ottawa (CA)

(73) Assignee: RPX Clearinghouse LLC, San Francisco, CA (US)

( * ) Notice: Subject to any disclaimer, the term of this patent is extended or adjusted under 35 U.S.C. 154(b) by 118 days.

(21) Appl. No.: 13/896,810

(22) Filed: May 17, 2013

(65) Prior Publication Data

US 2013/0254790 A1    Sep. 26, 2013

Related U.S. Application Data

(63) Continuation of application No. 11/280,615, filed on Nov. 16, 2005, now Pat. No. 8,464,299.

(60) Provisional application No. 60/628,577, filed on Nov. 17, 2004, provisional application No. 60/628,625, filed on Nov. 17, 2004.

(51) Int. Cl.
    *G06F 15/16*      (2006.01)
    *H04N 21/442*     (2011.01)
    *H04N 21/2343*    (2011.01)
    *H04N 21/2662*    (2011.01)
    *H04N 21/6373*    (2011.01)

(52) U.S. Cl.
    CPC ..... *H04N 21/44204* (2013.01); *H04N 21/2343* (2013.01); *H04N 21/2662* (2013.01); *H04N 21/44218* (2013.01); *H04N 21/44231* (2013.01); *H04N 21/6373* (2013.01)

(58) Field of Classification Search
    CPC combination set(s) only.
    See application file for complete search history.

(56) References Cited

U.S. PATENT DOCUMENTS

| | | | |
|---|---|---|---|
| 5,471,474 A | 11/1995 | Grobicki et al. | |
| 5,583,862 A | 12/1996 | Callon | |
| 5,761,197 A | 6/1998 | Takefman | |
| 5,850,397 A | 12/1998 | Raab et al. | |
| 5,959,990 A | 9/1999 | Frantz et al. | |
| 5,987,614 A * | 11/1999 | Mitchell et al. | 713/300 |
| 6,111,876 A | 8/2000 | Frantz et al. | |
| 6,115,823 A * | 9/2000 | Velasco et al. | 713/322 |
| 6,128,298 A | 10/2000 | Wootton et al. | |
| 6,128,649 A | 10/2000 | Smith et al. | |
| 6,130,893 A | 10/2000 | Whittaker et al. | |
| 6,192,397 B1 | 2/2001 | Thompson | |
| 6,321,253 B1 | 11/2001 | McKeen et al. | |

(Continued)

OTHER PUBLICATIONS

Non-Final Office Action for U.S. Appl. No. 11/280,615, mailed Aug. 19, 2008, 28 pages.

(Continued)

*Primary Examiner* — Kieu Oanh T Bui
(74) *Attorney, Agent, or Firm* — Withrow & Terranova, PLLC

(57) ABSTRACT

The present invention controls delivery of television content to conserve network resources based on whether the television content is being viewed on a television monitor. A television gateway may monitor a viewer's interactions with the television gateway to determine whether the television content is being viewed at the associated television monitor, or detect whether the television monitor is on or off. Upon determining that the viewer is not viewing the television content, various actions can be taken to conserve network resources.

57 Claims, 5 Drawing Sheets

(56) References Cited

U.S. PATENT DOCUMENTS

| | | |
|---|---|---|
| 6,373,923 B1 | 4/2002 | Williamson et al. |
| 6,496,519 B1 | 12/2002 | Russell et al. |
| 6,584,118 B1 | 6/2003 | Russell et al. |
| 6,650,618 B1 | 11/2003 | Peng et al. |
| 6,704,326 B2 | 3/2004 | Russell et al. |
| 6,813,674 B1 * | 11/2004 | Velasco et al. ............... 710/311 |
| 6,816,496 B2 | 11/2004 | Russell et al. |
| 6,845,389 B1 | 1/2005 | Sen et al. |
| 6,901,048 B1 | 5/2005 | Wang et al. |
| 7,154,879 B1 | 12/2006 | Pfeffer et al. |
| 7,207,014 B2 * | 4/2007 | Velasco et al. ............... 716/138 |
| 7,274,661 B2 | 9/2007 | Harrell et al. |
| 7,564,895 B2 | 7/2009 | Liu et al. |
| 8,134,197 B2 | 3/2012 | Forbes |
| 8,134,917 B2 | 3/2012 | Fredette et al. |
| 8,464,299 B1 * | 6/2013 | Meier et al. ............... 725/95 |
| 2002/0174437 A1 | 11/2002 | Mano et al. |
| 2003/0067872 A1 | 4/2003 | Harrell et al. |
| 2003/0097659 A1 | 5/2003 | Goldman |
| 2003/0206719 A1 | 11/2003 | Bumgardner et al. |
| 2005/0157215 A1 | 7/2005 | Minnick et al. |
| 2005/0188415 A1 | 8/2005 | Riley |
| 2006/0064729 A1 | 3/2006 | Steading |
| 2013/0254790 A1 * | 9/2013 | Meier et al. ............... 725/14 |

OTHER PUBLICATIONS

Final Office Action for U.S. Appl. No. 11/280,615, mailed Feb. 5, 2009, 33 pages.
Advisory Action for U.S. Appl. No. 11/280,615, mailed Apr. 20, 2009, 6 pages.
Examiner's Answer to Appeal Brief for U.S. Appl. No. 11/280,615, mailed Oct. 15, 2009, 39 pages.
Decision on Appeal for U.S. Appl. No. 11/280,615, mailed Nov. 13, 2012, 6 pages.
Notice of Allowance for U.S. Appl. No. 11/280,615, mailed Feb. 7, 2013, 7 pages.
Author Unknown, "PacketCable™ Multimedia Architecture Framework Technical Report," PKT-TR-MM-ARCH-V01-030627, 2003, Cable Television Laboratories, Inc., 43 pages.

* cited by examiner

RESOURCE CONSERVATION FOR PACKET TELEVISION SERVICES

This application claims the benefit of U.S. Provisional Patent Application Ser. No. 60/628,577 filed Nov. 17, 2004 and U.S. Provisional Patent Application Ser. No. 60/628,625 filed Nov. 17, 2004, as well as U.S. patent application Ser. No. 11/280,615, which was filed on Nov. 16, 2005, the disclosures of which are hereby incorporated by reference in their entireties.

FIELD OF THE INVENTION

The present invention relates to delivery of television content, and in particular to controlling delivery of television content to conserve network resources based on whether the television content is being viewed.

BACKGROUND OF THE INVENTION

The increasing bandwidth and reliability of packet networks has reached levels where streaming high quality television content is now possible. For packet-based television services, content providers will likely not send streaming television content for all available channels to all subscribers at the same time. Instead, only the television content for the selected channel will be streamed to the subscriber. As such, the amount of network resources required to service a given number of subscribers is greatly reduced from a scenario where subscribers are simultaneously receiving television content for many channels.

Even though network capacity is increasing, the number of potential subscribers is very large and the television content is growing more data intensive. Subscribers demand high quality television content, which corresponds to lower compression rates and greater bandwidth requirements. Further, the bandwidth required to support high-definition television content is many times that necessary for standard definition television content. Accordingly, there remains a need to conserve the network resources required to provide packet-based television services.

A significant waste of network resources occurs when television content is delivered to a television monitor that is not being viewed. Many subscribers leave their televisions on for long periods of time when no one is home or watching the television. It is also commonplace for subscribers to leave their set top boxes on, even when the television monitor is off. In either case, the television content is being delivered over the packet network to the set top box, thus wasting network resources. When thousands of subscribers are wasting network resources, such waste becomes significant and the packet network must be over built to accommodate the waste. In addition, video content will typically have very high priority in the network so video streams that are not being actively recorded or viewed will preclude or diminish the performance of other services vying for the network bandwidth. As such, there is a need for a technique to control delivery of the television content to conserve network resources when the television content is not being viewed.

SUMMARY OF THE INVENTION

The present invention controls delivery of television content to conserve network resources based on whether the television content is being viewed on a television monitor, where the term television monitor includes but is not limited to a television, a video processor with separate display panel, a video projector, or a portable or handheld device that is able to display a video stream. A television gateway may monitor a viewer's interactions with the television gateway to determine whether the television content is being viewed at the associated television monitor or detect whether the television monitor is on or off. Upon determining that the viewer is not viewing the television content, various actions can be taken to conserve network resources. Conservation actions may be avoided if the content is being recorded. These actions may include providing instructions to the content provider to halt delivery of all or a portion of the television content or provide the television content at a reduced quality level to reduce the bandwidth needed for transporting the television content. If delivery of the television content is halted, the television gateway may provide a blank screen or locally stored television content to the television monitor for display. When a conservation action is taken, an alert may be provided for display on the television monitor before, during, or after initiating the action to alert the viewer of the action.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a packet-based television environment according to one embodiment of the present invention.

FIGS. 2A and 2B provide a flow diagram illustrating operation of a television gateway according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention controls delivery of television content to conserve network resources based on whether the television content is being viewed on a television monitor. In one embodiment, a television gateway, such as a set top box or residential gateway, monitors a viewer's interactions with the television gateway to determine whether the television content is being viewed at the associated television monitor. If the viewer is not viewing the television content, various actions can be taken to conserve network resources. These actions may include providing instructions to a content provider to halt delivery of the television content or provide the television content at a reduced quality level to reduce the bandwidth needed for transporting the television content. If delivery of the television content is halted, the television gateway may provide a blank screen or locally stored television content to the television monitor for display. In another embodiment, the television gateway monitors the power or current consumption of the television monitor to determine whether the television content is being viewed.

Figure 1:
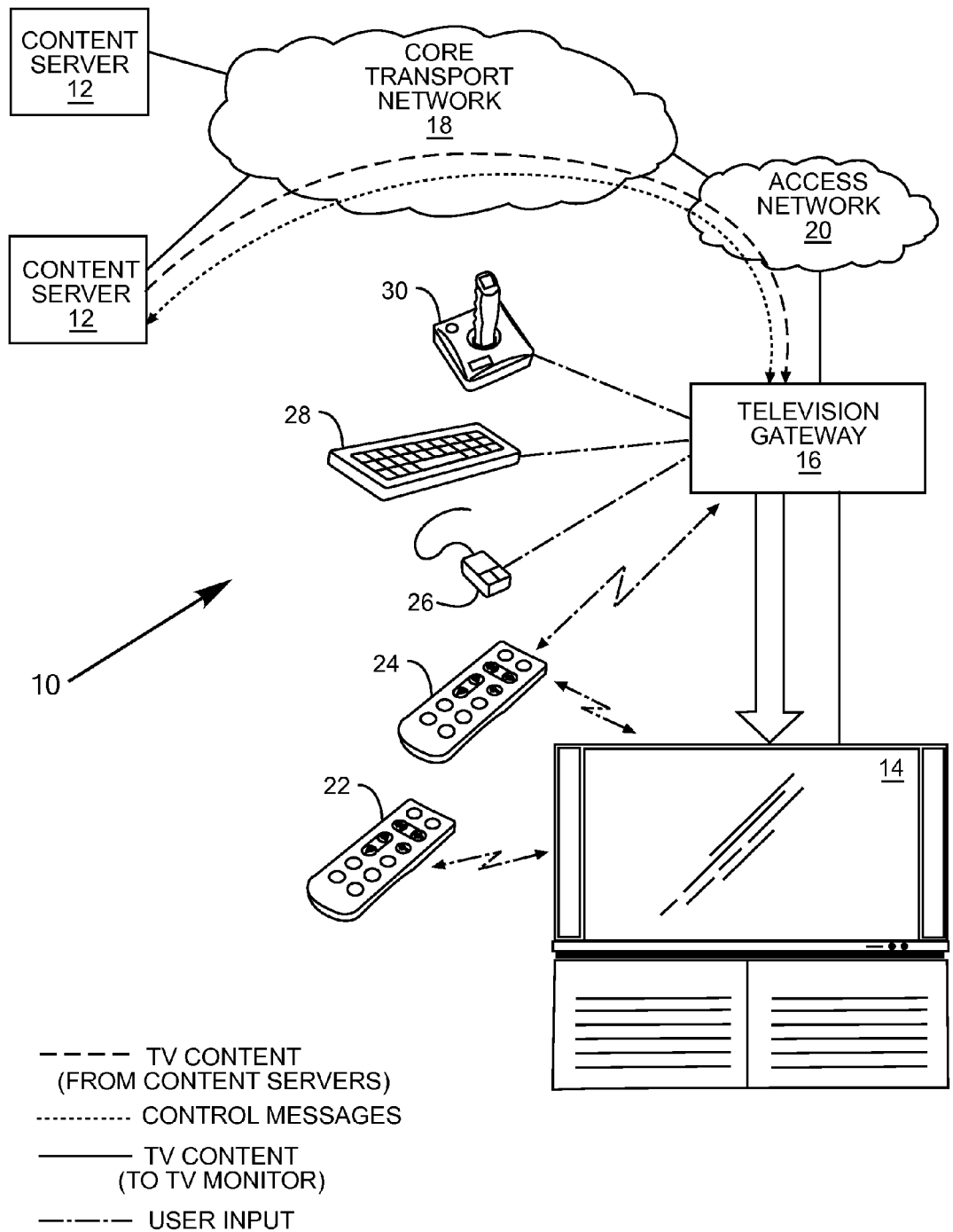

With reference to FIG. 1, a packet-based television environment 10 is illustrated wherein content servers 12 are able to stream packet-based television content to a television monitor 14 via a television gateway 16, which may represent a set top box or like device. The content servers 12 may reside on a core transport network 18, wherein an access network 20 is used to facilitate a connection between the television gateway 16 and the core transport network 18. The streamed television content may be delivered using any number of appropriate packet-based communication protocols, including the Internet Protocol (IP).

In operation, the television gateway 16 and the content servers 12 are able to exchange control messages to effectively control the delivery of the television content from the content servers 12 to the television gateway 16, which will process the received television content as necessary and then deliver the television content to the television monitor 14 in an appropriate format for display. The television gateway 16 and content servers 12 can cooperate to allow the television gateway 16 to receive software and firmware updates, exchange billing information for various services, report viewer activity, and the like. Middleware may be provided on the content servers 12, a standalone network element, or a combination thereof to assist in providing an electronic programming guide and user profiles. The middleware may also be able to monitor user actions and viewing behaviors.

Viewers will have various mechanisms with which to control the television monitor 14 and the television gateway 16. For example, a television monitor remote control 22 may be provided for controlling only the television monitor 14. Alternatively, a multi-function remote control 24 may be used to control aspects of the television gateway 16 as well as the television monitor 14. Other input devices may include a mouse 26, keyboard 28, or joystick 30. In one embodiment of the present invention, these input devices are used to detect viewer activity, which is indicative of the viewer actually viewing the television content that is being received by the television gateway 16 and delivered to the television monitor 14 for viewing. The television gateway 16 can make a determination as to whether the television content is being viewed. If a determination is made that the television content is not being viewed, the television gateway 16 can take appropriate action to conserve network resources. These actions may include but are not limited to instructing the content server 12 to stop delivering the television content, instructing the content server 12 to reduce the quality of the television content in an effort to reduce the data rate or bandwidth associated with delivering the television content, or the like. Other examples will be described further below.

Figure 2A:
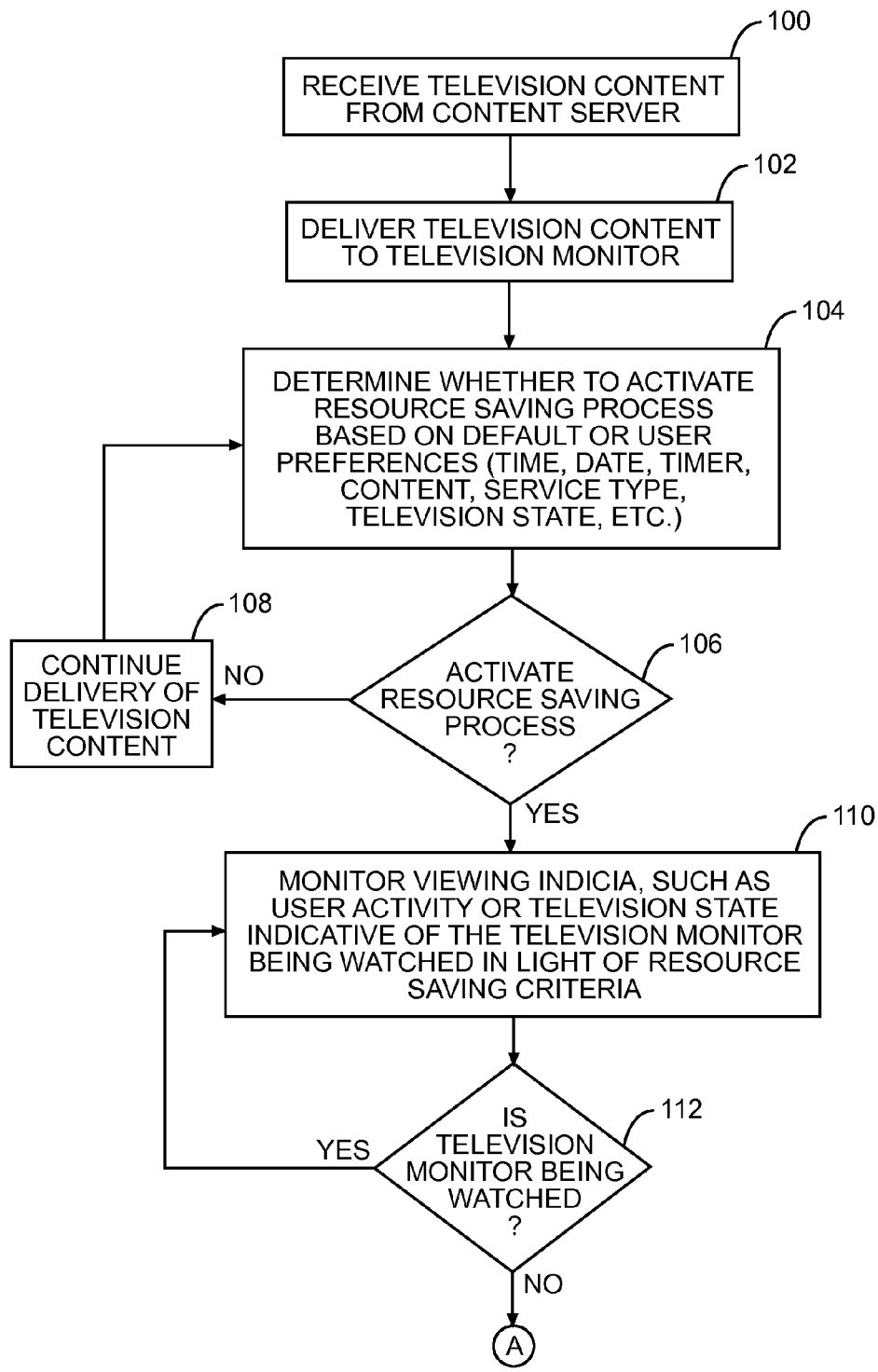
Figure 2B:
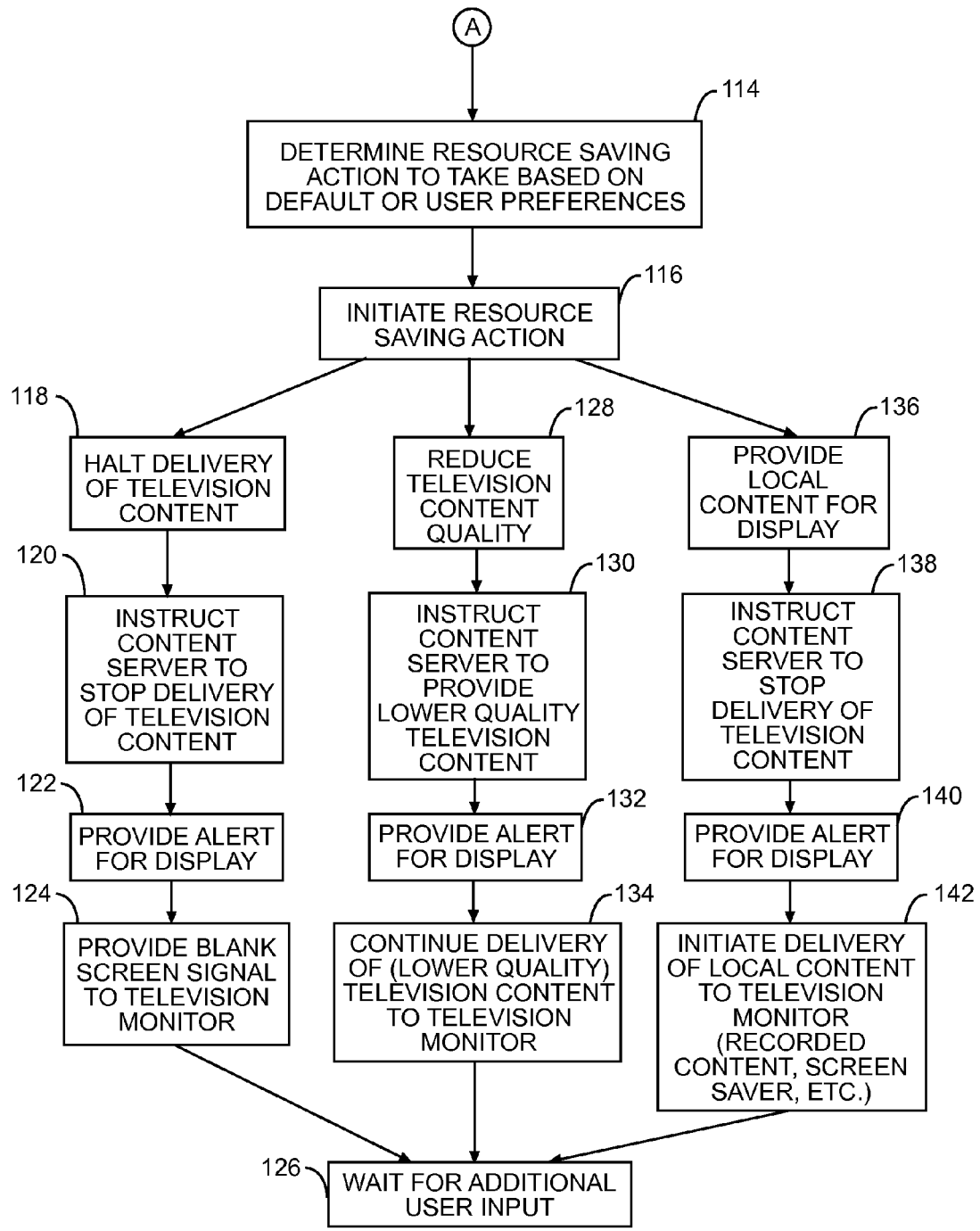

Turning now to FIGS. 2A and 2B, a flow diagram illustrates operation of the television gateway 16 according to one embodiment of the present invention. Assume that the television gateway 16 has reacted to viewer input and instructed a content server 12 to deliver selected television content for viewing. Accordingly, the television gateway 16 will receive the television content from the appropriate content server 12 (step 100) and deliver the television content to the television monitor 14 for display (step 102).

Upon receiving the television content, or at some point while the television content is being delivered, the television gateway 16 will determine whether to activate a resource saving process, which is a process used to determine if and when a resource saving action should be taken (step 104). Virtually any criteria may be used to determine if and when to activate the resource saving process. In this embodiment, the resource saving process is initiated based on either default or user preferences, which are stored by the television gateway 16 or made accessible to the television gateway 16. The default or user preferences help to define the criteria used to activate the resource saving process and may be based on the current time, date, timer expiration, the television content, the type of television content (service type), whether the television monitor is on or off, and the like. The criteria may also be based on bandwidth or other resources required by other applications or services. Information bearing on the requirements of other applications or services may come from various network entities, as well as the television gateway 16.

For example, the preferences for activating the resource saving process may dictate that activation occur after two hours of viewing a given channel, during daytime hours, and only if television content is not pay-per-view content. Notably, activation of the resource saving process does not trigger a resource saving action, but simply activates a process to determine whether a resource saving action should be taken. If the resource saving process should not be activated (step 106), delivery of the television content will continue (step 108), wherein another determination whether to activate the resource saving process may take place at a future time or on a periodic or systematic basis (step 104).

If the resource saving process should be activated (step 106), the television gateway 16 will begin monitoring viewing indicia, which may be virtually any type of information indicative of the television monitor 14 being watched, in light of resource saving criteria (step 110). The viewing indicia may relate to user activity involving the television gateway 16 and indicative of a viewer being present to view the television content provided to the television monitor 14. User activity could involve the viewer changing channels, changing volume, pausing, rewinding, fast forwarding, or otherwise providing input to control the television gateway 16. Viewing indicia relating to the television state may relate to whether the television monitor 14 is on or off. If the television monitor 14 is off, the television gateway 16 can readily determine that the television monitor 14 is not being viewed. As will be described further below, the television gateway 16 may be able to monitor power or current consumption of the television monitor 14 to determine whether the television monitor 14 is on or off. The resource saving criteria are essentially the rules or guidelines to which the viewing indicia is applied to allow the television gateway 16 to determine whether the television monitor 14 is being watched.

If the television gateway 16 determines that the television monitor 14 is being watched (step 112), the television gateway 16 will continue monitoring the viewing indicia according to the resource saving process (step 110). If the television monitor 14 is not being watched (step 112), the television gateway 16 may determine a resource saving action to take based on the default or user preferences, if multiple resource saving actions are available (step 114). The television gateway 16 will then initiate a resource saving action (step 116). In the illustrated example, the television gateway 16 can initiate one of three resource saving actions: halting delivery of the television content, reducing the quality of the television content, and providing local content, which is locally stored on the television gateway 16 or associated device, for display instead of the television content from the content server 12.

If the resource saving action to halt delivery of the content is selected (step 118), the television gateway 16 will instruct the content server 12 to stop delivery of the television content (step 120), provide an alert for the viewer to display on the television monitor 14 (step 122), and provide a blank screen signal to the television monitor 14 (step 124). At this point, the television gateway 16 may wait for additional user input before taking additional action (step 126).

If the resource saving action was to reduce the quality of the television content to effectively reduce the data rate associated with delivering the television content and thus the required bandwidth associated with delivering the television content (step 128), the television gateway 16 will instruct the content server 12 to provide a lower quality version of the television content (step 130). As such, the content server 12 may employ more intense compression algorithms and/or reduce the content resolution to minimize the data rates necessary to deliver the television content to the television gateway 16. During this process, the television gateway 16 may provide an alert to the viewer for display on the television monitor 14 (step 132). The alert may indicate that a lower quality television signal is being provided, as well as provide the viewer with an option to go back to viewing the higher quality television signal. The television gateway 16 will then continue to deliver the television content to the television monitor 14 (step 134) and wait for additional user input prior to taking further action (step 126).

If the resource saving action is to provide local content for display on the television monitor 14 (step 136), the television gateway 16 may instruct the content server 12 to stop delivery of the television content (step 138), provide an alert to the viewer for display on the television monitor 14 indicating that local content is being displayed (step 140), and then initiate delivery of the local content to the television monitor (step 142). The local content may be recorded at the television gateway 16 or may be provided by another media device. The actual content may be a stored television program, slideshow, or desired screen saver. Again, the television gateway 16 may wait for additional user input before taking additional action (step 126).

As those skilled in the art will appreciate, the television gateway 16 may erroneously determine that a viewer is not watching the television content being provided to the television monitor 14, even if the television monitor 14 is being viewed by the viewer. As such, customer satisfaction demands that the resource saving criteria be configured to react to the viewing indicia in an accurate manner. This is important in order to ensure that the television gateway 16 does not errantly initiate a resource saving action when the television monitor 14 is being viewed. As a corollary, there is a desire to minimize wasted network resources, and therefore, have the television gateway 16 determine when the television monitor 14 is not being viewed as quickly as possible. To maximize the efficiency of the resource saving process, the resource saving criteria may have many variables, including various viewing indicia.

Figure 3:
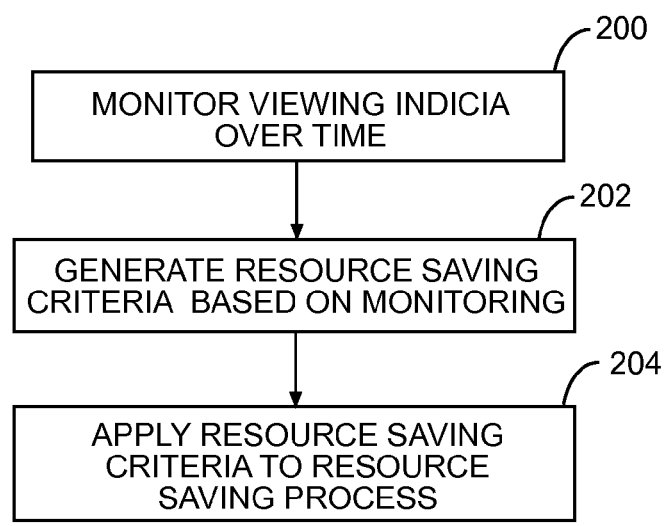
FIG. 3 is a flow diagram illustrating a learning technique according to one embodiment of the present invention.

Further, a learning process may be employed wherein the television gateway 16 will analyze the viewer's habits over time in light of various viewing indicia to create customized resource saving criteria, which are based on the habits of the viewer or viewers associated with a given television gateway 16. For example, if a user never views content late at night, the stream is still active late at night, and the recording device is not active, then it is likely that no one is viewing the television content. As such, the television gateway 16 may employ the resource saving action. These statistics can be pulled from the middleware that tracks user requests for content and viewing patterns. An exemplary learning process is provided in the flow diagram of FIG. 3. Initially, the television gateway 16 will monitor viewing indicia over time (step 200) and generate customized resource saving criteria based on the monitoring of the viewing indicia (step 202). The television gateway 16 will then apply the resource saving criteria to control the resource saving process described above (step 204).

Those skilled in the art will recognize that there are numerous ways to modify the present invention as well as additional or optional actions that may be taken in association with implementing the present invention. For example, the television gateway 16 may be configured to turn off the power to the television monitor 14 when the television content is not being viewed. Further, since most of the bandwidth associated with the television content is allocated to the video content, the television gateway 16 could instruct the content server 12 to continue delivery of the audio content and halt the video content. As indicated, different types of programming, such as video-on-demand or pay-per-view content, which may involve less user interaction or require a fee for viewing, may warrant not using the resource saving process or changing the resource saving process to be less invasive or restrictive. Many of the actions may be provided in sequence. For example, once it is determined that the television content is not being viewed, the first action may operate to reduce the quality of the television content. If user input is not received within a certain amount of time after a reduction in the quality of the television content, a second action could be taken to halt the delivery of the television content and provide a screen saver or locally recorded content to the television monitor 14.

As an alternative to the above-illustrated embodiment, an alert could be provided prior to initiating the resource saving action and give the viewer time to cancel the resource saving action before the action is initiated. If the television gateway 16 can operate as a digital video recorder (DVR), the resource saving process may be deactivated when television content is being recorded. The resource saving process may also be tied to the relative length of the programming, wherein for a two-hour program, the resource saving process will not be initiated for at least two hours. Programming length can be obtained from the middleware or electronic programming guide. Alternatively, the resource saving process may be initiated at the end of a program or at the beginning of another program, as well as at different times throughout the program, depending on the desires of the user and the presets provided by the content providers.

Figure 4:
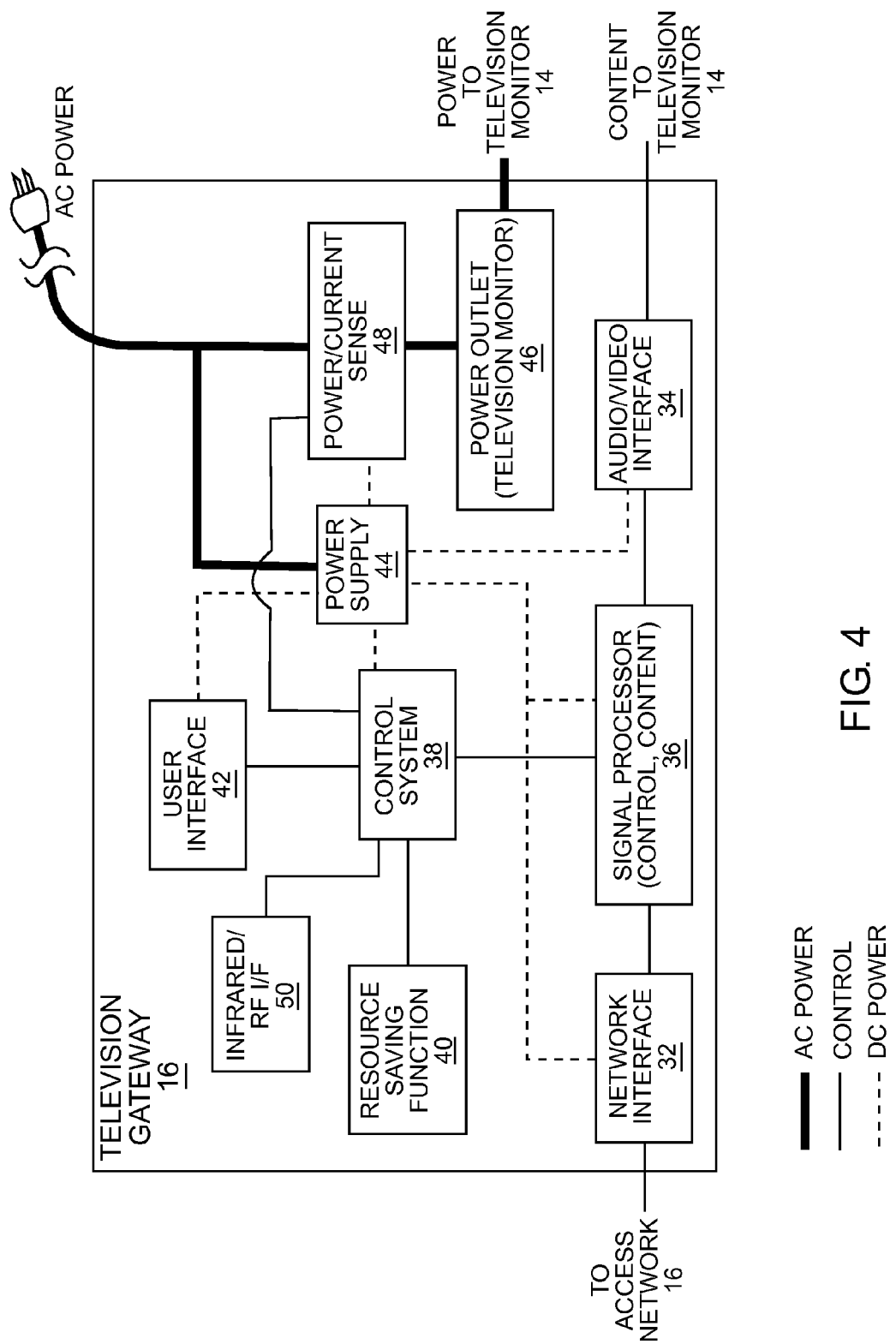
FIG. 4 is a block representation of a television gateway according to one embodiment of the present invention.

With reference to FIG. 4, a block representation of a television gateway 16 is provided. The television gateway 16 will include a network interface 32 adapted to connect directly or indirectly to the access network 16 and an audio/video interface 34 adapted to provide content to the television monitor 14. The content will definitely include the television content, and may include audio content as well. The audio content may also be provided to an optional stereo receiver or like audio processor. The audio/video interface 34 may provide analog or digital audio and video signals, or a combination thereof, depending on the desired connectors and formats. The television content received via the network interface 32 will be processed in traditional fashion by a signal processor 36 and forwarded through the audio/video interface 34 for delivery to the television monitor 14. In addition to processing the television content, the signal processor 36 may be involved in providing signaling to the content servers 12 via the network interface 32, as well as to the television monitor 14 via the audio/video interface 34.

The functionality afforded by the television gateway 16 is predominantly controlled by a control system 38, which cooperates with the signal processor 36 to provide the functionality described above. In particular, the control system 38 will have the requisite memory and data to implement a resource saving function 40, which effectively implements the resource saving process. The control system 38 is also associated with a user interface 42, which is configured to receive user input directly through an associated keypad or any of the other input devices illustrated in FIG. 1. The user interface 42 may also provide a display directly on the television gateway 16. Accordingly, the viewing indicia relating to viewer activity is received via the user interface 42 and processed by the control system 38 in light of the resource saving criteria.

When the viewing indicia relates to the power or current consumption of the television monitor 14, the television gateway 16 may include additional circuitry to monitor the power or current supplied to the television monitor 14. In particular, the television gateway 16 will generally have a power supply 44, which supplies power to the various electronics in the television gateway 16 from an AC power source. The AC power source may also provide AC power to a power outlet 46 into which the power cord for the television monitor 14 can be plugged. Thus, the television monitor 14 will derive its power from the television gateway 16. If a power or current sense circuit 48 is used to monitor the power or current provided to the television monitor 14, power or current provided to the television monitor 14 can be determined at any given time, and provided to the control system 38 as viewing indicia. Accordingly, when the television monitor 14 is on, a higher power and current are provided to the television monitor 14. When the television monitor 14 is off, a lower power or current level is provided to the television monitor 14. As such, the control system 38 will have a clear indication as to whether the television monitor 14 is on or off.

Notably, different television monitors 14 will require different power or current levels for operation. As such, the control system 38 may cooperate with the power or current sense circuitry 48 to monitor the power or current provided to the television monitor 14 over a given period of time, and effectively learn the respective levels for the on and off states. Once the learning is complete, the control system 38 will be ready to process the viewing indicia received from the power or current sense circuitry 48 in an effective manner. If a learning process is not desirable, default power or current levels may be defined for on or off states.

The television gateway 16 may also include an infrared or radio frequency (RF) interface 50 capable of transmitting wireless signals to recording devices and the television monitor 14. For the present invention, the television gateway 16 may turn the television monitor 14 off by transmitting an appropriate signal via the infrared or RF interface 50 when content delivery is stopped as part of a resource saving action. The power sensing function can be used to confirm that the television monitor 14 is off. Those skilled in the art will recognize other types of wired or wireless interfaces through which the television monitor 14 may be controlled.

Accordingly, the present invention provides an efficient and effective technique for conserving network resources based on whether the television content being delivered for viewing is actually being viewed. A determination as to whether the television content is actually being viewed may be based on user activity indicative of the content being viewed, whether the television monitor 14 is in an on or off state based on power or current consumption monitoring, or a combination thereof. If a determination is made that the television content is not being viewed, various actions may be taken to stop the delivery of the television content or change aspects of the television content to minimize the network resources necessary for transporting the television content for viewing.

Those skilled in the art will recognize improvements and modifications to the preferred embodiments of the present invention. All such improvements and modifications are considered within the scope of the concepts disclosed herein and the claims that follow.

What is claimed is:

1. A method of operating a video display system having a video display, the method comprising:
   receiving video content delivered from a content provider over a communication network to the video display system;
   displaying the received video content on the video display;
   monitoring at least one viewing indicator; and
   responsive to the at least one viewing indicator meeting at least one resource saving criterion, initiating reduction of consumption of communication network resources due to delivery of the video content to the video display system.

2. The method of claim 1, wherein the at least one viewing indicator is indicative of whether the displayed video content is being viewed.

3. The method of claim 2, wherein the at least one resource saving criterion is deemed to be met when the at least one viewing indicator does not indicate that the displayed video content is being viewed.

4. The method of claim 1, wherein initiating reduction of consumption of communication network resources due to delivery of the video content to the video display system comprises signaling into the communication network to modify delivery of the video content from the content provider over the communication network to the video display system so as to reduce consumption of communication network resources.

5. The method of claim 4, wherein signaling into the communication network to modify delivery of the video content from the content provider over the communication network to the video display system so as to reduce consumption of communication network resources comprises signaling to stop delivery of the video content over the communication network to the video display system.

6. The method of claim 5, comprising displaying locally stored content on the video display when delivery of the video content over the communication network to the video display system is stopped.

7. The method of claim 4, wherein signaling into the communication network to modify delivery of the video content from the content provider over the communication network to the video display system so as to reduce consumption of communication network resources comprises signaling the content provider.

8. The method of claim 4, wherein signaling into the communication network to modify delivery of the video content from the content provider over the communication network to the video display system so as to reduce consumption of network resources comprises signaling to deliver a reduced bandwidth video signal over the communication network to the video display system.

9. The method of claim 8, wherein the video display system provides a viewer alert when a reduced bandwidth video signal is received over the communication network.

10. The method of claim 9, wherein the video display system has a user interface that enables a viewer to cause signaling of the content provider requesting delivery of a higher bandwidth video signal when the video display system is receiving a reduced bandwidth video signal.

11. The method of claim 1, wherein monitoring at least one viewing indicator comprises monitoring viewer interactions with the video display system.

12. The method of claim 1, wherein action taken to reduce consumption of communication network resources due to delivery of the video content to the video display system is based on viewer preferences.

13. The method of claim 1, wherein monitoring at least one viewing indicator is based on at least one viewer preference.

14. The method of claim 1, wherein the at least one resource saving criterion is based on at least one viewer preference.

15. The method of claim 1, wherein the at least one viewing indicator meets the at least one resource saving criterion only when the received video content is not being recorded and the at least one viewing indicator does not indicate that the displayed video content is being viewed.

16. The method of claim 1, wherein the at least one resource saving criterion depends on the network resources consumed by delivery of the video content to the video display device.

17. The method of claim 1, comprising creating at least one customized resource saving criterion based on analysis of at least one monitored viewing indicator.

18. The method of claim 1, wherein the video display is provided on a portable device.

19. The method of claim 1, wherein the video display is provided on a hand-held device.

20. The method of claim 1, wherein monitoring at least one viewing indicator and initiating reduction of consumption of communication network resources due to delivery of the video content to the video display system are performed by a network interface device and displaying the video content of the video display is performed by a display device downstream from the network interface device.

21. A video display system, comprising:
a communication network interface configured to receive video content delivered from a content provider over a communication network;
a video display configured to display the received video content on the video display; and
a control system configured to monitor at least one viewing indicator and, responsive to the at least one viewing indicator meeting at least one resource saving criterion, to reduce consumption of communication network resources due to delivery of the video content to the video display system.

22. The video display system of claim 21, wherein the at least one viewing indicator is indicative of whether the displayed video content is being viewed.

23. The video display system of claim 22, wherein the at least one resource saving criterion is deemed to be met when the at least one viewing indicator does not indicate that the displayed video content is being viewed.

24. The video display system of claim 21, wherein the control system is configured to reduce consumption of communication network resources due to delivery of the video content to the video display system by signaling into the communication network to modify delivery of the video content from the content provider over the communication network to the video display system so as to reduce consumption of communication network resources.

25. The video display system of claim 24, wherein the control system is configured to signal into the communication network to modify delivery of the video content from the content provider over the communication network to the video display system so as to reduce consumption of communication network resources by signaling to stop delivery of the video content over the communication network to the video display system.

26. The video display system of claim 25, wherein the control system is configured to display locally stored content on the video display when delivery of the video content over the communication network to the video display system is stopped.

27. The video display system of claim 24, wherein the control system is configured to signal into the communication network to modify delivery of the video content from the content provider over the communication network to the video display system so as to reduce consumption of communication network resources by signaling the content provider.

28. The video display system of claim 24, wherein the control system is configured to signal into the communication network to modify delivery of the video content from the content provider over the communication network to the video display system so as to reduce consumption of network resources by signaling to deliver a reduced bandwidth video signal over the communication network to the video display system.

29. The video display system of claim 28, wherein the control system is configured to provide a viewer alert when a reduced bandwidth video signal is received over the communication network.

30. The video display system of claim 28, comprising a user interface configured to enable a viewer to cause signaling of the content provider requesting delivery of a higher bandwidth video signal when the video display system is receiving a reduced bandwidth video signal.

31. The video display system of claim 21, wherein the control system is configured to monitor user interactions with the video display system to determine whether a viewer viewing the received content on the video display can be detected.

32. The video display system of claim 21, configured such that action taken to reduce consumption of communication network resources due to delivery of the video content to the video display system is based on viewer preferences.

33. The video display system of claim 21, wherein the monitored at least one viewing indicator is based on at least one viewer preference.

34. The video display system of claim 21, the at least one resource saving criterion is based on at least one viewer preference.

35. The video display system of claim 21, wherein the at least one viewing indicator meets at least one resource saving criterion only when the received video content is not being recorded and the at least one viewing indicator does not indicate that the displayed video content is being viewed.

36. The video display system of claim 21, wherein the at least one resource saving criterion depends on the network resources consumed by delivery of the video content to the display device.

37. The video display system of claim 21, wherein the controller is configured to create at least one customized resource saving criterion based on analysis of at least one monitored viewing indicator.

38. The video display system of claim 21, wherein the video display is provided on a portable device.

39. The video display system of claim 21, wherein the video display is provided on a hand-held device.

40. The video display system of claim 21, wherein the control system is at least partially implemented on a network interface device and the video display is implemented on a display device downstream from the network interface device.

41. Apparatus for reducing network resource consumption associated with delivery of video content for display, the apparatus comprising:
a communication network interface configured to receive video content delivered from a content provider over a communication network; and
a control system configured to monitor at least one viewing indicator and, responsive to the at least one viewing indicator meeting at least one resource saving criterion, to reduce consumption of communication network resources associated with the delivery of the video content.

42. The apparatus of claim 41, wherein the at least one viewing indicator is indicative of whether the displayed video content is being viewed.

43. The apparatus of claim 42, wherein the at least one resource saving criterion is deemed to be met when the at least one viewing indicator does not indicate that the displayed video content is being viewed.

44. The apparatus of claim 41, wherein the control system is configured to reduce consumption of communication network resources due to delivery of the video content by signaling into the communication network to modify delivery of the video content from the content provider over the communication network so as to reduce consumption of communication network resources.

45. The apparatus of claim 44, wherein the control system is configured to signal into the communication network to modify delivery of the video content from the content provider over the communication network to the video display system so as to reduce consumption of communication network resources by signaling to stop delivery of the video content over the communication network.

46. The apparatus of claim 45, wherein the control system is configured to provide locally stored content when delivery of the video content over the communication network to the video display system is stopped.

47. The apparatus of claim 44, wherein the control system is configured to signal into the communication network to modify delivery of the video content from the content provider over the communication network so as to reduce consumption of communication network resources by signaling the content provider.

48. The apparatus of claim 44, wherein the control system is configured to signal into the communication network to modify delivery of the video content from the content provider over the communication network so as to reduce consumption of network resources by signaling to deliver a reduced bandwidth video signal over the communication network to the video display system.

49. The apparatus of claim 48, wherein the control system is configured to provide a viewer alert when a reduced bandwidth video signal is received over the communication network.

50. The apparatus of claim 48, comprising a user interface configured to enable a viewer to cause signaling of the content provider requesting delivery of a higher bandwidth video signal when the video display system is receiving a reduced bandwidth video signal.

51. The apparatus of claim 41, wherein the control system is configured to monitor user interactions with a video display to determine whether a viewer viewing the received content on the video display can be detected.

52. The apparatus of claim 41, configured such that action taken to reduce consumption of communication network resources due to delivery of the video content is based on at least one viewer preference.

53. The apparatus of claim 41, wherein the monitored at least one viewing indicator is based on at least one viewer preference.

54. The apparatus of claim 41, the at least one resource saving criterion is based on at least one viewer preference.

55. The apparatus of claim 41, wherein the at least one viewing indicator meets the at least one resource saving criterion only when the received video content is not being recorded and the at least one viewing indicator does not indicate that the displayed video content is being viewed.

56. The apparatus of claim 41, wherein the at least one resource saving criterion depends on the network resources consumed by delivery of the video content.

57. The apparatus of claim 41, wherein the controller is configured to create at least one customized resource saving criterion based on analysis of at least one monitored viewing indicator.

* * * * *